United States Patent [19]

Zayle

[11] Patent Number: 4,743,892
[45] Date of Patent: May 10, 1988

[54] ON-SITE PERSONAL MONITORING SYSTEM

[75] Inventor: Frank T. Zayle, Englewood, Colo.

[73] Assignee: Family Communications, Inc., Englewood, Colo.

[21] Appl. No.: 1,400

[22] Filed: Jan. 8, 1987

[51] Int. Cl.$^4$ .............................................. G08B 21/00
[52] U.S. Cl. ...................................... 340/573; 379/38
[58] Field of Search ........................... 340/573, 309.15; 379/38, 40, 51

[56] References Cited

U.S. PATENT DOCUMENTS

| | | | |
|---|---|---|---|
| 3,982,238 | 9/1976 | Byers | 340/573 |
| 4,012,732 | 3/1977 | Herrick | 340/573 |
| 4,064,368 | 12/1977 | Dibner | 379/38 |
| 4,524,243 | 6/1985 | Shapiro | 340/573 |

Primary Examiner—Glen R. Swann, III
Assistant Examiner—Tat K. Wong
Attorney, Agent, or Firm—Klaas & Law

[57] ABSTRACT

A monitoring system to confirm the presence or absence of a monitored individual through that individual's prescribed activity at a particular site at one or more pre-set times during a day. The system comprises an on-site station in communication through an automatic communicator with a remote central station. The on-site station has a signal generating device pre-settable to at least one particular time of day at which time the signal generating device emits an on-site signal for a period of time beginning at the pre-set time. The signal generating device can be manually deactivated during this period of time, but if it is not, the signal generating device activates the automatic communicator which causes notification thereof to the central station which identifies the notification and retrieves and displays pre-collected data on the monitored individual including instructions to be followed. Monitoring personnel can then follow these instructions which can include calling the site, notifying a parent or the police or the like.

14 Claims, 3 Drawing Sheets

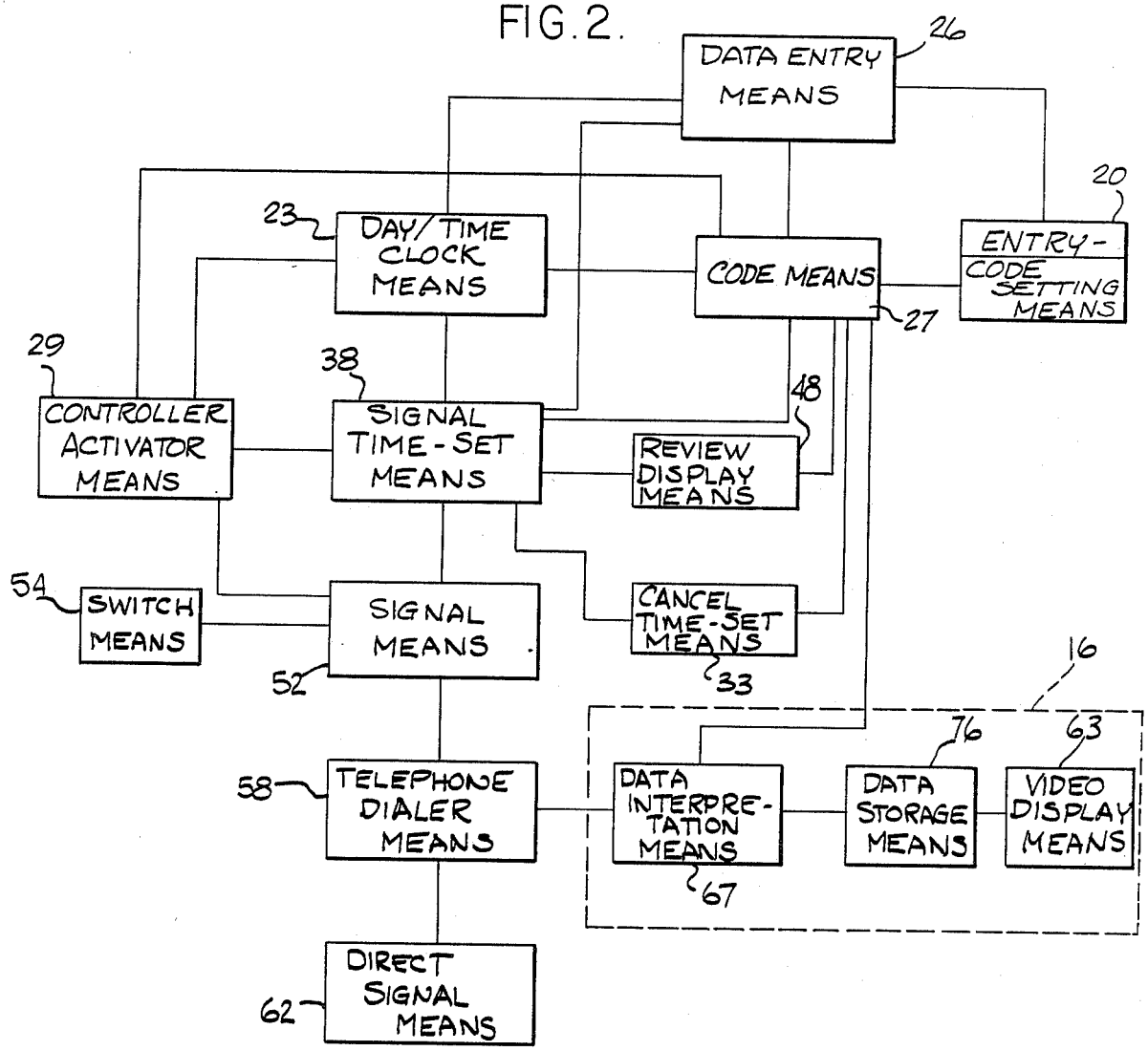

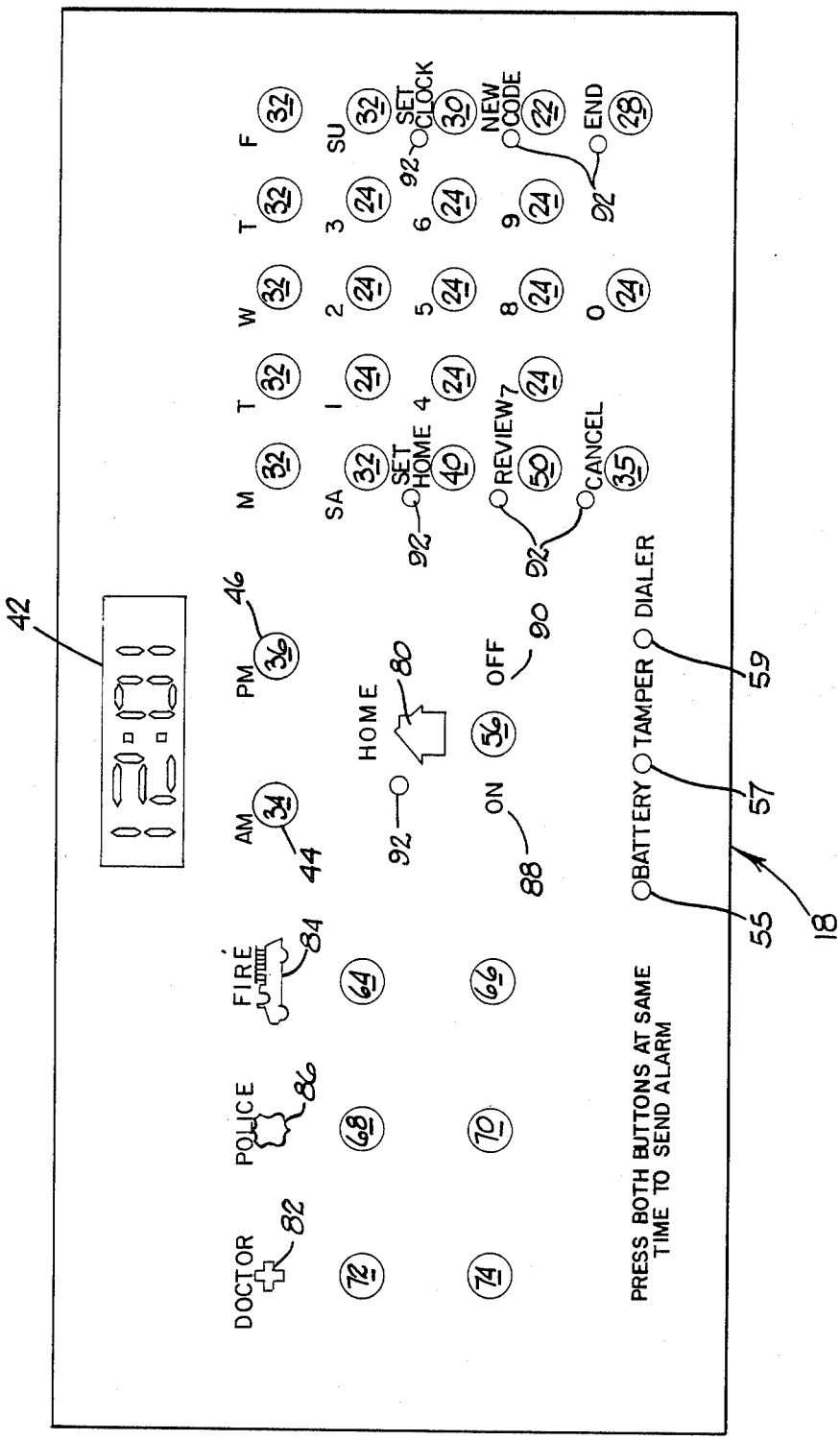

ON-SITE PERSONAL MONITORING SYSTEM

BACKGROUND OF THE INVENTION

This invention relates to a monitoring system to confirm the presence of an individual at a particular site at one or more pre-determined particular times during a day.

In today's society where an individual such as a child must assume individual responsibility for safe arrival and presence at a particular location such as his home without the company or supervision of another such as a parent, it is most important that the well-being of that individual who is alone be known, or, conversely, that any adverse conditions affecting that individual be discovered as soon as is reasonably possible. In addition, pre-set times can be used by handicapped and elderly persons to indicate that medication must be taken, that medical equipment is working properly, and that the protected person is safe and well.

Various systems have been developed which speak toward the monitoring of activity or lack of activity of individuals at particular sites. One such system, described in U.S. Pat. No. 4,524,243, incorporated herein by reference, provides for automatic notification of a remote central monitoring station if an activity sensor at a subscriber's location has not been activated for a pre-set period of time (e.g. 24 hours). Such "activity sensors" can include a re-set switch means integral with the system as well as other sensing devices such as door switch sensors, telephone handset lifting sensors, television power on/off sensors, or the like. In any event, the activation of any one of these sensors will cause the pre-set period of time to start over, without establishing a specific time each day when the well-being of the individual can be confirmed. Instead, the system only monitors or confirms the fact that some sensed activity, which may be a passive event, occurred at the individual's location during the preceding pre-set time period. Similarly, U.S. Pat. No. 4,064,368, incorporated herein by reference, describes an emergency alarm and response system wherein an alarm to a central station is activated by a timer if no activity occurs during a selected timed period. Certain activity such as use of a telephone by the monitored individual resets the timer and the selected time period for inactivity starts over. Therefore, no pre-determined specific time of day can be chosen for confirmation of well-being of the monitored individual.

The present invention provides a monitoring system which can confirm the presence or absence of an individual at a specific site at a specific time of day by required selective manual activity of that individual at such specific time and site. Accordingly, it is a primary object of the present invention to provide a monitoring system wherein a monitored individual's presence or absence at a specific site can be confirmed remotely therefrom at a specific time of day. It is another object of the invention to provide a monitoring system which can confirm such presence or absence at a plurality of times per day. Yet another object of the invention is to provide a monitoring system wherein the time of day for such monitoring can be changed only by an authorized individual. Another object of the invention is to provide a monitoring system which additionally notifies a need for emergency assistance. These and other objects of the invention will become apparent throughout the following description.

SUMMARY OF THE INVENTION

The present invention comprises a monitoring system for determining the presence or absence of a monitored person at a particular site at a particular time of the day. The system comprises, first of all, an on-site subscriber station means comprising a settable clock means; a signal time-set means capable of retaining an entered pre-set time and associated with an on-site warning signal means emitting an on-site warning signal for a period of time beginning at the pre-set time; a manually operable switch means associated with the on-site warning signal means manually deactivating the on-site warning signal means while the warning signal therefrom is being emitted; and an automatic communications means such as an automatic telephone dialing means for calling a central station means and associated with the on-site warning signal means and activatable by said on-site warning signal means when the on-site warning signal means is not manually deactivated during warning signal emission. It is to be noted that the automatic communications means can also be radio means, microwave means, satellite communication devices, or the like. Secondly, the monitoring system comprises a remote central station means with data storage means for storing data relating to the monitored person; data display means for displaying data relating to the monitored individual; and data interpretation means associated with the data storage means and data display means and in communication with the automatic communications means for means activation by a call from the automatic communications means to receive and interpret the call, retrieve corresponding data from the data storage means, and display this data on the data display means. Personnel monitoring the display means can then use the data there presented which may include instructions for calling the site, calling the police, or the like. The on-site station means can additionally include direct signal means manually operable and associated with the automatic communications means to notify the central station means of a chosen event such as the need for fire or police protection or medical assistance.

BRIEF DESCRIPTION OF THE DRAWINGS

An illustrative and presently preferred embodiment of the invention is shown in the accompanying drawings in which:

FIG. 1 is a block diagram of a monitoring system;

FIG. 2 is a block diagram of the monitoring system of FIG. 1, in detail;

FIG. 3 is a front elevation view of the face of an on-site station means of the monitoring system;

DETAILED DESCRIPTION OF A PREFERRED EMBODIMENT

Figure 5:
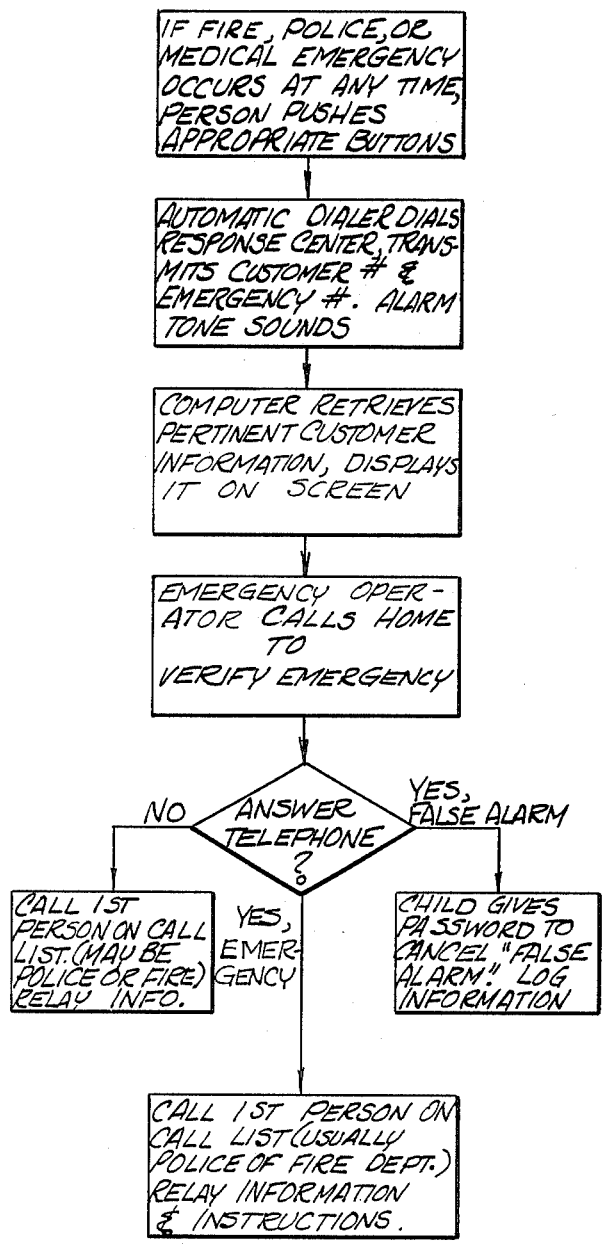
FIG. 5 is a flow diagram of a second operation of the monitoring system of FIG. 1.

In general, the present invention comprises a monitoring system which confirms the presence or absence of an individual through that individual's selectively manually-initiated prescribed activity pursuant to a pre-determined procedure at a particular site at one or more pre-set times during a day. The system comprises an on-site subscriber station means which is in communication with a central station means and which has pre-settable warning signal means settable for at least one particular time of day. When that time occurs, the warning signal means emits an on-site warning signal such as an audible tone and flashing light which the monitored individual must turn off within a pre-set period of time to thereby deactivate the warning signal means. If no response to the warning signal occurs within this period of time, the warning signal means activates an automatic communications means such as an automatic dialer means which notifies the central station means so that appropriate action can be undertaken to locate the individual. The on-site station means additionally comprises direct signal means, as for emergencies, which are manually operable to activate the automatic dialer means and notify the central station means.

Referring to FIGS. 1 and 2, a monitoring system 10 is illustrated in block-diagram form. The system 10 comprises an on-site subscriber station means 12 in communication via telephone line means 14 with a remote central station means 16. The on-site station means 12, operating on AC current and having a battery backup, employs conventional electronic circuitry throughout activated by operation of conventional control buttons disposed on the face 18 of the on-site station means 12 as shown in FIG. 3.

Referring now to FIGS. 2 and 3, an authorized individual such as a parent selects a numerical code such as a three digit number and enters this number via the entry code setting means 20 and data entry means 26 into the code means 27 by first pressing the button 22 designated "new code" on the face 18, then pressing three numerically-designated buttons 24 representing the selected code, and finally pressing the button 28 designated "end" which controls data entry via the data entry means 27 to conclude programming. Entry into the on-site station means 12 to change any data stored therein now requires use of the numerical code since the code means 27 controls data entry ability, thereby preventing the change of any desired function by a unauthorized individual such as a child being monitored.

After entry of his code, the authorized individual employs the electronic day/time clock means 23 to set the clock by pressing the "set clock" button 30, entering the correct time of day by pressing the numerical buttons 24, the "AM" button 34 or "PM" button 36, and the correct day button 32 (respectively designated by initial for the days of the week). Clock time is displayed via a digital readout means 42, while "AM" or "PM" is displayed by an illumination of the respective "AM" or "PM" letters 44, 46.

In the preferred embodiment here described, the warning signal time-set means 38 can accommodate up to three alarm times per 24-hours day. To set the alarm times, the authorized individual enters his numerical code, and then activates the electronic time-set means 38 by pressing the "set home" button 40. After so doing, the individual presses the numerical buttons 24 to enter the desired time, the appropriate "AM" or "PM" buttons 34, 36, the desired day button 32, and the time number (e.g., 1, 2, or 3) for the particular day. Use of the review display means 48 by pressing the "review" button 50 causes times entered to flash on the digital readout means 42. As necessary, a particular alarm time can be cancelled by entry of the code number which activates the code means 27 to cause the cancel time-set means 33 to operate when the "cancel" button 35 is pressed and the day and time number are entered. To activate the warning signal time-set means 38, the authorized individual enters his numerical code which enables the code means 27 to activate the controller activity means 29 when the individual presses the "home" button 56. The "end" button 28 is then pressed. "On" and "off" designations 88, 90, respectively, illuminate to confirm the operational status of the on-site station means 12.

As shown in FIG. 2, the warning signal time-set means 38 is in communication with the warning signal means 52 which is activated to emit a tone and cause the "home" button 56 to flash when a pre-selected time occurs. This audible/visual signal is emitted for a period of time (e.g. 30 minutes) during which time it can be turned off by the monitored individual through employment of the switch means 54 by pressing the "home" button 56 on the face 18 of the on-site station means 12. Such action deactivates the warning signal means 52. If no such required manual activity is performed in response to the warning signal within its time period of operation, the warning signal means 52 activates the telephone dialer means 58 which telephones the data interpretation means 67 of the central station means 16 to advise that no response was made to the signal. The interpretation means 67 interprets the message so transmitted, retrieves corresponding data from a data storage means 76, and visually displays on video display means 63 to monitoring personnel the data which may include directions to be followed, such as telephoning the site, calling a parent, dispatching the police, or the like.

The on-site station means 12 additionally has direct signal means 62 for specific emergencies, such as the reporting of a fire, the need for the police, and the need for medical help. The direct signal means 62 is activated by simultaneously pressing two respective appropriate buttons on the face 18 of the on-site station means 12. Requiring two buttons rather than one to be pressed helps to eliminate false alarms. For example, buttons 64, 66 are depressed to report a fire, buttons 68, 70 to summon the police; and buttons 72, 74 to request medical aid. The direct signal means 62 differentiates among the three choices and activates the telephone dialer means 58 which telephonically conveys the chosen message to the interpretation means 67 for visual display identification of the particular emergency. Personnel monitoring the display means 63 then take appropriate action.

Finally, the on-site station means 12 can be provided with self-monitoring means for battery and dialer efficiency as well as evidence of tampering as would occur if entry of an incorrect code number were attempted. Warning lights 55, 57, 59, respectively, can alert the user. Likewise, for ease and convenience in operation, the face 18 of the on-site station means 12 can be provided with identification words as well as graphic indicia such as a house 80 to indicate the "home" button 56, a cross 82 for medical needs, a fire engine 84 for fire protection needs, and a badge 86 to summon the police. Additionally, respective lights 92 illuminate in accord with functions being performed as respective buttons adjacent thereto are depressed.

Figure 4:
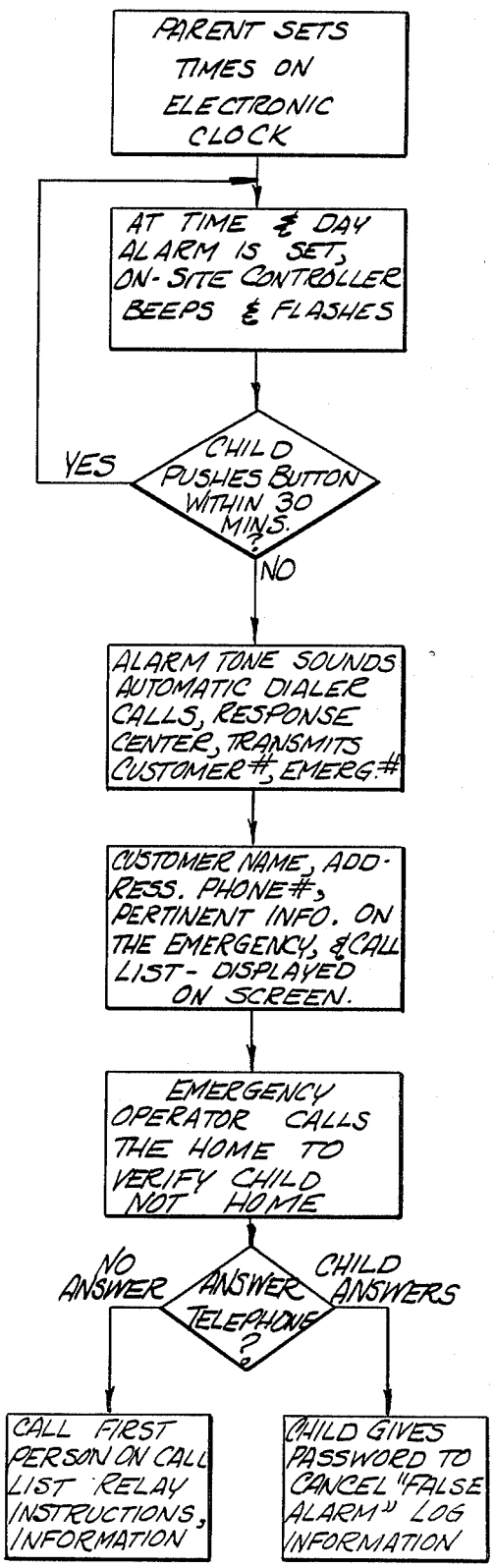
FIG. 4 is a flow diagram of one operation of the monitoring system of FIG. 1.

FIG. 4 illustrates operation of the monitoring system as would be employed by a parent to confirm the safety and well-being of his child. Thus, in operation, the parent sets alarm times. At the respective times set, the warning signal means of the on-site station means emits an audible and visual warning signal. If the child responds by turning off the warning signal during its time period of operation and thereby deactivates the warning signal means, the on-site station means simply re-sets itself for any subsequent alarm time for that day. Conversely, if no response is made, the automatic telephone dialer means is activated and transmits a message to the data interpretation means of the central station means which acts to visually display subscriber identification data and instructions to be followed by monitoring personnel. If these instructions include the telephoning of the site, the child can have been previously apprised of a code word which he must give monitoring personnel should he answer to cancel the false alarm caused by his inaction in deactivating the alarm and if he is safe. Thus, if he answers, but is not safe, he does not provide a password, and monitoring personnel will know that a problem situation exists. If the child does not answer the telephone call, monitoring personnel then follow the instructions visually displayed.

In a similar manner, as shown in FIG. 5, if direct signal means indicating a need for fire, police or medical help is activated, such message is conveyed to the monitor station means for visual display. Monitoring personnel may then telephone to confirm such need or cancel a false alarm again using the correct password. If the need is confirmed, if no password is provided or if there is no telephone answer, the monitoring personnel take the appropriate action. Thus, the monitoring system here described permits confirmation of an individual's presence at a specific location at specific times by requiring a selectively manually-initiated activity of deactivating the warning signal means, and can additionally provide direct alarm signal capabilities for certain emergency situations.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A monitoring system for determining the presence or absence of a monitored person at a particular site at a particular time of day, said system comprising:
   (a) an on-site subscriber station means situated at the particular site, said on-site station means comprising:
      i. a settable clock means for maintaining and displaying time and day;
      ii. a signal time-set means for retaining an entered pre-set time therein and associated with a warning signal means for emitting an on-site warning signal for a period of time beginning at the pre-set time entered into said warning signal time-set means;
      iii. a manually operable switch means associated with the signal means for manually deactivating the signal means during the period of time the signal therefrom is being emitted; and
      iv. an automatic communications means for calling a central station means and associated with the warning signal means and activatable by said warning signal means when the warning signal means is not manually deactivated during the period of time the warning signal therefrom is being emitted; and
   (b) a central station means for receiving calls by the communications means and situated remotely from the on-site station means, said central station means comprising:
      i. data storage means for storing data relating to the monitored person;
      ii. data display means for displaying said data related to the monitored person;
      iii. data interpretation means associated with the data storage means and the data display means and in communication with and activatable by a call from the automatic communications means of the on-site station means for receiving and interpreting a call from said automatic communications means, retrieving corresponding data from the data storage means and displaying said data on the data display means.

2. The invention according to claim 1 wherein the automatic communications means is a telephone dialer means.

3. The invention according to claim 1 or 2 wherein the warning signal emitted by the warning signal means is an audible tone.

4. The invention according to claim 3 wherein the warning signal emitted by the warning signal means additionally is a flashing light.

5. The invention according to claim 1 or 2 and wherein the signal time-set means is capable of retaining a plurality of entered pre-set times.

6. The invention according to claims 1 or 2 and additionally comprising a code identification means for activating the on-site station means when a pre-set code is entered into said code identification means.

7. The invention according to claim 6 wherein the on-site station means additionally comprises direct signal means associated with the automatic dialer means and manually operable for activating said dialer means to activate the data interpretation means of the central station means.

8. The invention according to claims 1 or 2 wherein the on-site station means additionally comprises direct signal means associated with the automatic communications means for activating the data interpretation means of the central station means.

9. A method for determining the presence or absence of a monitored person at a particular site at a particular time of day, said method comprising:
   (a) providing at the particular site an on-site subscriber station means in communication with a remote central station means and having a warning signal means pre-settable to at least one particular time of day for emitting an on-site warning signal for a period of time beginning at said pre-set time and being manually de-activatable, with said warning signal means associated with an automatic communications means for calling the central station means and activated by the warning signal means if said warning signal means is not deactivated during said period of time to thereby notify the central station means of non-deactivation of the signal means by the monitored person;
   (b) providing at the central station means automatic communications notification interpretation means associated with data storage means, for storing data concerning the monitored person, data display means for displaying said data, and data interpretation means for receiving and interpreting a call from the communications means and retrieving and displaying said data concerning the monitored person which can include instructions to be followed when the warning signal means is not deactivated by said person;
(c) pre-setting the warning signal means to at least one particular time when the monitored person is to be present; and
(d) providing monitoring personnel to monitor the data display means and use the data displayed thereon in response to non-deactivation of said warning signal means by the monitored person.

10. The invention according to claim 9 wherein the warning signal means is pre-set for a plurality of times when the monitored person is to be present.

11. The invention according to claim 9 wherein the data stored concerning the monitored person includes identities of persons to be notified upon non-deactivation of the warning signal means.

12. The invention according to claim 5 and additionally comprising a code identification means for activating the on-site station means when a pre-set code is entered into said code identification means.

13. The invention according to claim 5 wherein the on-site station means additionally comprises direct signal means associated with the automatic communication means for activating the data interpretation means of the central station means.

14. The invention according to claim 12 wherein the on-site station means additionally comprises direct signal means associated with the automatic dialer means and manually operable for activating said dialer means to activate the data interpretation means of the central station means.

* * * * *